Sept. 27, 1927. L. O. GRONDAHL Re. 16,744

RAILWAY SIGNALING

Original Filed Feb. 9, 1922 2 Sheets-Sheet 1

INVENTOR:
L. O. Grondahl,
BY A. L. Kenall
His ATTORNEY

Sept. 27, 1927. L. O. GRONDAHL Re. 16,744

RAILWAY SIGNALING

Original Filed Feb. 9, 1922 2 Sheets-Sheet 2

INVENTOR:
L. O. Grondahl,
BY A. F. Wenzel
His ATTORNEY

Reissued Sept. 27, 1927. Re. 16,744

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNALING.

Original application filed February 9, 1922, Serial No. 535,194. Renewed April 6, 1925. Original No. 1,599,711, dated September 14, 1926. Application for reissue filed August 18, 1927. Serial No. 213,940.

My invention relates to railway signaling, and is particularly well adapted to signaling of the type wherein roadside signals are governed by track circuits which in turn are controlled by the passage of cars or trains along the track.

I will describe two forms of signaling apparatus embodying my invention and will then point out the novel features thereof in claims.

Figures 1, 2:
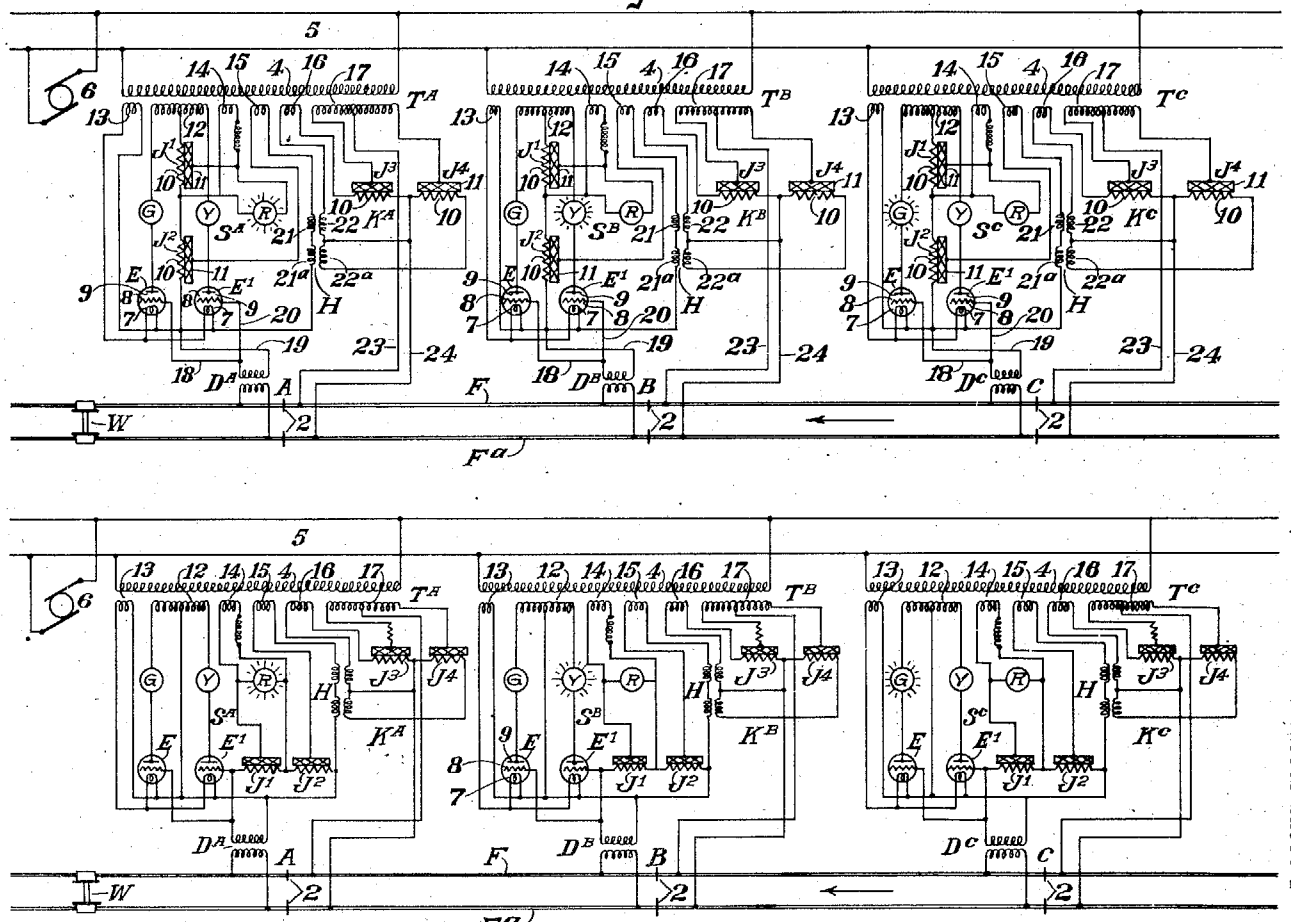

In the accompanying drawing, Fig. 1 is a diagrammatic view showing one form of signaling apparatus embodying my invention while Fig. 2 is a view showing a modification of the apparatus shown in Fig. 1 and also embodying my invention. Figs. 3, 4, 5, 6, 7 and 8 are views showing other forms of apparatus which may be employed to control the stop lamp R, all of which also embody my invention.

Similar reference characters refer to similar parts in each of the several views.

Referring first to Fig. 1, the reference characters F and $F^a$ designate the track rails of a railway along which traffic normally moves in the direction indicated by the arrow. These rails are divided into a plurality of successive track sections A—B, B—C, etc., the isolation of the track sections being accomplished, as here shown, by insulated joints 2 in both of the lines of rails, although any other suitable means of isolating the sections may be employed without departing from the spirit and scope of my invention.

Located adjacent the entrance end of each track section is a railway signal, designated by the reference character S with an exponent corresponding to the location. In the form here shown, each signal comprises three lamps G, Y and R, adapted when lighted to indicate "proceed", "caution" and "stop" respectively.

Each track section is provided with a track circuit comprising a suitable source of current and a current receiving device, both of which are connected across the track rails. As here shown, the source of current is the secondary 17 of a transformer designated by the reference character T with an exponent corresponding to the location. The secondary is connected across the rails adjacent the exit end of the track section through a pole-changing device K for reversing the relative instantaneous polarity of the current supplied to the rails, which pole-changing device is hereinafter explained. The primary 4 of each transformer T is connected with a transmission line 5, which is constantly supplied with alternating signaling current by a generator 6. The current receiving device in the form here shown, is a transformer designated by the reference character D with an exponent corresponding to the location, the primary of which is connected across the rails adjacent the entrance end of the track section.

Each signal is controlled in part by two electron tubes E and $E^1$, each comprising a vacuum bulb enclosing a filament 7, a grid 8, and a plate 9. The filaments 7 of the two bulbs at each signal location are constantly heated by the secondary 13 of the adjacent transformer T, through a circuit which will be obvious from the drawing. Each electron tube E and $E^1$ is provided with a grid circuit which is energized from the secondary of the adjacent transformer D. Considering location B, for example, the grid circuit for tube E is from the secondary of transformer $D^B$, through wire 18, grid and filament of tube E, and wire 19 to the secondary of transformer $D^B$. Similarly, the grid circuit for tube $E^1$ at this location is from the secondary of transformer $D^B$, through wire 20, grid and filament of tube $E^1$, and wire 19 to the secondary of transformer $D^B$.

Each tube E and $E^1$ is also provided with a plate circuit which is energized from the secondary 12 of the adjacent transformer T. Considering location B, for example, the plate circuit for electron tube E is from the left hand terminal of secondary 12, through the proceed lamp G, plate and filament of tube E, heating element 10 of a thermo-sensitive relay $J^2$, and heating element 10 of a thermo-sensitive relay $J^1$ to the middle point of secondary 12. The plate circuit for tube $E^1$ is from the right-hand terminal of secondary 12, through lamp Y, plate and filament of tube $E^1$, heating element 10 of relay $J^2$, and heating element 10 of relay $J^1$ to the middle point of secondary 12.

It will be observed that at any given instant the polarity of the grids 8 of the two tubes E and $E^1$ are the same, whereas at any given instant the polarities of the plates 9 of tubes E and $E^1$ are opposite. It follows that when the track circuit current is of one relative polarity, the plate 9 of tube E will be positive with respect to the filament at the same instant that the grid 8 is positive with respect to the filament, so that the plate circuit for tube E is conductive, whereas in tube $E^1$ the plate 9 will be negative with respect to the filament at the same instant that the grid is positive with respect to the filament, so that the plate circuit for this tube will be non-conductive; on the other hand, when the polarity of the track circuit current is reversed, the plate circuit for tube E will be non-conductive and the plate circuit for tube $E^1$ will be conductive.

Each relay $J^1$ and $J^2$ comprises the heating element 10, and a thermo-sensitive element 11 responsive to variations in temperature by varying its electrical resistance. Each thermo-sensitive element has a negative temperature coefficient, and so it follows that when the heating element 10 is cold, that is, when it is not supplied with current, the resistance of the thermo-sensitive element 11 is comparatively high, whereas, when the heating element 10 is hot, that is, when it is supplied with current, the resistance of the thermo-sensitive element 11 is comparatively low.

The stop lamp R of each signal is directly connected with a secondary 12 of the adjacent transformer T, and this lamp is provided with a shunt which includes the thermo-sensitive element 11 of the adjacent relay $J^1$. When the relay $J^1$ is energized, its resistance is so low that lamp R is extinguished, but when this relay is de-energized its resistance is so high that sufficient current flows through lamp R to cause this lamp to be lighted.

The apparatus for controlling the polarity of the track circuit current is designated as a whole by the reference character K with an exponent corresponding to the location, and is in substance the same as the apparatus disclosed in Fig. 2 of Letters Patent of the United States No. 1,555,495 granted to Lars O. Grondahl and Lester E. Spray on the 29th day of September, 1925, for electrical apparatus. Briefly described, this apparatus is as follows: The middle point of transformer secondary 17 is connected with one track rail F by a wire 23, while the two outer terminals of this secondary are connected with the other rail $F^a$ through wire 24 and the thermo-sensitive elements of two thermo-sensitive relays $J^3$ and $J^4$ respectively, both of which relays have negative temperature co-efficients. The heating element 10 of relay $J^3$ is connected in a circuit which includes a secondary winding 16 on the adjacent transformer T and the secondary 22 of an adjacent transformer H, these two secondaries being so connected that they oppose each other. The heating element 10 of relay $J^4$ is connected with another secondary $22^a$ on transformer H. The two primary windings 21 and $21^a$ of transformer H are connected in series, and are included in a circuit which contains a secondary 15 on the adjacent transformer T and the thermo-sensitive element 11 of the adjacent relay $J^2$. The primary 21 and secondary 22 of transformer H are inductively independent of the primary $21^a$ and secondary $22^a$. When relay $J^2$ is energized, current of considerable value is supplied to transformer H by secondary 15, so that relay $J^4$ is energized by current from secondary $22^a$. The voltage of secondary 22 substantially neutralizes that of secondary 16, however, so that relay $J^3$ is de-energized. The resistance of relay $J^4$ is then low, whereas the resistance of relay $J^3$ is high, so that current is supplied to the track rails of the corresponding section by the right-hand half of transformer secondary 17. On the other hand, when relay $J^2$ is de-energized, the current furnished by secondary 15 is negligible, so that the current in the primaries of transformer H is low. Relay $J^4$ is then de-energized, whereas relay $J^3$ is energized due to current which is now supplied by secondary 16. The resistance of relay $J^4$ is, consequently, high, but the resistance of relay $J^3$ is low, so that current is supplied to the track rails by the left-hand half of secondary 17. It will be seen therefore, that current of one relative instantaneous polarity or the other is supplied to the track rails of each section according as the thermo-sensitive relay $J^2$ at the exit end of each section is energized or de-energized.

The operation of the apparatus shown in Fig. 1, is as follows:

As here shown, the track section to the left of location A is occupied by a car or train W, so that the supply of current to the primary of transformer $D^A$ is discontinued or reduced to an extremely low value. Both of the grid circuits at location A are consequently de-energized, so that both plate circuits are non-conductive, with the result that both lamps G and Y at this location are extinguished. There being no current in either plate circuit, it follows that the relays $J^1$ and $J^2$, the heating elements of which are common to the plate circuits, are both de-energized. The resistance of relay $J^1$ is consequently high, so that the stop lamp R of signal $S^A$ is lighted. The resistance of relay $J^2$ is likewise high, so that in the pole-changing device $K^A$ relay $J^3$ is energized and relay $J^4$ is de-energized, with the result that the track section A—B is supplied with current from the left-hand half of transformer secondary 17. The relative polarity of this current is such that the electron tube $E^1$ at location B is conductive and the electron tube E at this location is non-conductive. It follows that lamp Y of signal $S^B$ at location B is lighted and lamp G is extinguished. Lamp R is likewise extinguished because relay $J^1$ is energized by the current flowing in the plate circuit of tube $E^1$. Relay $J^2$ at location B is also energized, so that in the pole-changing apparatus $K^B$ the relay $J^4$ is energized and the relay $J^3$ is de-energized. This causes current from the right-hand half of secondary 17 of transformer $T^B$ to be supplied to the track circuit for section B—C, and the relative polarity of this current is such as to render the tube E at location C conductive and the tube $E^1$ at this same location non-conductive. Lamp G of signal $S^C$ is consequently illuminated and lamp Y is extinguished, lamp R also being extinguished because relay $J^1$ is energized by the current in the plate circuit for tube E.

Referring now to Fig. 2, the apparatus shown in this view is the same as that shown in Fig. 1, except that the thermo-sensitive relays $J^1$ and $J^2$ are removed from the common return wire for the plate circuits of electron tubes E and $E^1$ and are placed in series directly across the secondary of the adjacent transformer D. It follows that each pair of relays $J^1$ and $J^2$ will be energized when the corresponding track section is unoccupied, and de-energized when such track section is occupied, so that these relays are energized and de-energized under the same conditions as in Fig. 1.

The operation of the system shown in Fig. 2 will be readily understood in view of the detailed explanation set forth hereinbefore of the operation of the system shown in Fig. 1.

In Figs. 1 and 2, it will be observed that the stop lamp R is connected across a transformer secondary 14, and that the thermo-sensitive element of relay $J^1$ is connected in multiple with the lamp, the control being such that when relay $J^1$ is de-energized the lamp is lighted, but that when this relay is energized sufficient current is shunted away from the lamp to extinguish the lamp. Other arrangements for the control of the stop lamp are illustrated in Figs. 3, 4, 5, 6, 7 and 8.

Figure 3:
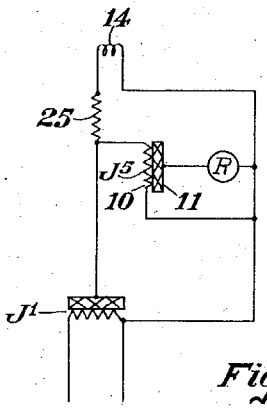

Referring to Fig. 3, the lamp R and the thermo-sensitive element of relay $J^1$ are connected in multiple across secondary 14 as in the preceding views, but in series with the lamp is the thermo-sensitive element 11 of an additional relay $J^5$ the heating element 10 of which is also connected across secondary 14. A resistance 25 is preferably included in the circuit as shown. When relay $J^1$ is energized, the amount of current flowing in the heating element of relay $J^5$ is so small that this relay is also de-energized, whereby the resistance of the thermo-sensitive element of relay $J^5$ is high and lamp R is extinguished. When relay $J^1$ becomes de-energized, however, the current in the heating element of relay $J^5$ increases, so that the resistance of the thermo-sensitive element of this relay decreases to such extent that the lamp becomes lighted. This arrangement has an advantage over those shown in Figs. 1 and 2 in that the load on relay $J^1$ is reduced and a smaller change in voltage at this relay accomplishes the desired result.

Figure 4:
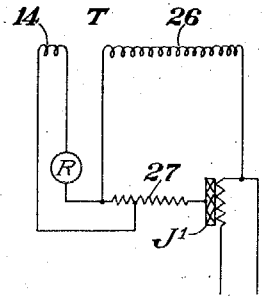

In Fig. 4 the apparatus for the control of lamp R embodies the potentiometer principle. An additional secondary 26 on transformer T is connected across a resistance 27, the thermo-sensitive element of relay $J^1$ being included in such connection, while the circuit for secondary 14 includes the lamp R and a portion of resistance 27. When relay $J^1$ is energized, the drop across the portion of resistance 27 which is in series with lamp R balances the voltage of secondary 14 so that the lamp is extinguished. When relay $J^1$ becomes de-energized, the current in resistance 27 is reduced, so that the voltage across the left-hand portion of this resistance is reduced and no longer balances the voltage of secondary 14; lamp R then becomes lighted.

Figure 5:
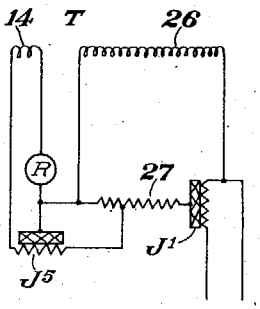

Fig. 5 is the same as Fig. 4 except that an additional thermo-sensitive relay $J^5$ is introduced for the same reason as in Fig. 3, so that the control of lamp R may be effected by a smaller change in the voltage across the left-hand portion of resistance 27.

Figure 6:
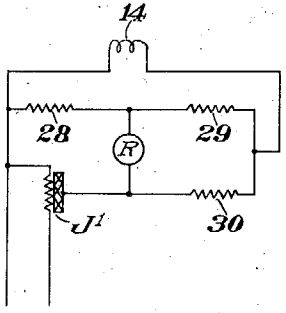

The apparatus shown in Fig. 6 embodies the Wheatstone bridge principle. That is to say, the four resistance arms of the bridge are formed by three resistances 28, 29 and 30 and the thermo-sensitive element of relay $J^1$, while the bridge member is the lamp R. When relay $J^1$ is energized the bridge is balanced so that no current flows in lamp R, but when relay $J^1$ becomes de-energized the balance is destroyed and sufficient current is then supplied to lamp R to light this lamp.

Figure 7:
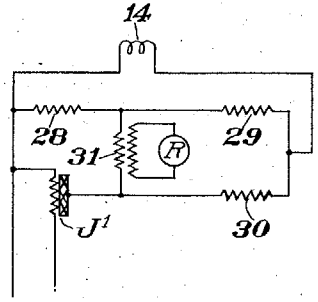

The apparatus shown in Fig. 7 is the same as that of Fig. 6 except that a step-up transformer 31 is introduced between the bridge and the lamp R to increase the voltage applied to the lamp when the bridge is unbalanced.

Figure 8:
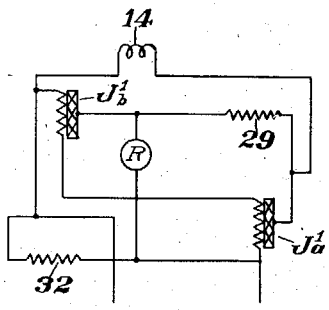

The apparatus shown in Fig. 8 also embodies the Wheatstone bridge principle, but differs from Fig. 6 in that the lamp is controlled by two relays $J^1_a$ and $J^1_b$, the thermo-sensitive elements of which constitute two opposite arms of the bridge. The remaining arms are resistances 29 and 32. When the relays are energized, the bridge is balanced and the lamp is extinguished. When the relays become de-energized, current will flow from secondary 14 through resistance 29, lamp R, and resistance 32 to secondary 14, and so the lamp will become lighted. If desired, a transformer may be interposed between the bridge and the lamp as in Fig. 7.

Although I have herein shown and described only certain forms of signaling apparatus embodying my invention, it is understood that various changes and modifications may be made therein within the scope of the appended claims without departing from the spirit and scope of my invention.

Having thus described my invention, what I claim is:

1. In combination, a section of railway track, a source of alternating current reversibly connected with the rails of said sections, two electron tubes, a grid circuit for each tube energized from said track rails in such manner that the grids have the same polarity at any given instant, a transformer the primary of which is constantly supplied with current of the same frequency as that supplied to said track rails, a plate circuit for each tube one of which extends from the middle point of the secondary of said transformer to one secondary terminal and the other of which extends from the said middle point to the other secondary terminal, a proceed signal and a caution signal controlled by said two plate circuits respectively, a device included in circuit with said secondary and common to said two plate circuits and responsive to variations in the current strength therein, and a stop signal controlled by said device.

2. In combination, a section of railway track, a source of alternating current reversibly connected with the rails of said section, two electron tubes, a grid circuit for each tube energized from said track rails in such manner that the grids have the same polarity at any given instant, a transformer the primary of which is constantly supplied with current of the same frequency as that supplied to said track rails, a plate circuit for each tube one of which extends from the middle point of the secondary of said transformer to one secondary terminal and the other of which extends from the said middle point to the other secondary terminal, a proceed signal and a caution signal controlled by said two plate circuits respectively, a relay comprising a heating element included in circuit with said secondary and common to the two plate circuits and a member of thermo-sensitive substance, and a stop signal controlled by said substance.

3. In combination, a section of railway track, a source of alternating current reversibly connected with the rails of said section, two electron tubes, a grid circuit for each tube energized from said track rails, two plate circuits one for each tube and including a conductor common to the two, the circuits for said tubes being so connected that one plate circuit or the other is conductive according as the current supplied to the track rails is of one instantaneous relative polarity or the other, a proceed signal and a caution signal controlled by said two plate circuits respectively, a device controlled by the conductor common to said two plate circuits and responsive to current amplitude variations therein, and a stop signal controlled by said device.

4. In combination, a section of railway track, a source of alternating current reversibly connected with the rails of said section, two electron tubes, a grid circuit for each tube energized from said track rails, two plate circuits one for each tube and including a conductor common to the two, the circuits for said tubes being so connected that with track current of one relative polarity the grid and plate of one tube are positive at the same instant and the grid and plate of the other tube are positive and negative at the same instant while with track current of the other relative polarity the grid and plate of the first tube are positive and negative at the same instant and the grid and plate of the second tube are both positive at the same instant, a device controlled by the conductor common to the two plate circuits and responsive to current amplitude variations therein, and signaling means governed by said two plate circuits and by said device.

5. In combination, a section of railway track, a source of alternating current reversibly connected with the rails of said section, two electron tubes, a grid circuit for each tube energized from said track rails, two plate circuits one for each tube and including a conductor common to the two, the circuits for said tubes being so connected that one plate circuit or the other is conductive according as the current supplied to the track rails is of one instantaneous relative polarity or the other, a device controlled by the conductor common to the two plate circuits and responsive to current amplitude variations therein, and signaling means governed by said two plate circuits and by said device.

6. In combination, a section of railway track, a source of alternating current reversibly connected with the rails of said section, two electron tubes, a grid circuit for each tube energized from said track rails, two plate circuits, one for each tube and including a conductor common to the two, the circuits for said tubes being so connected that one plate circuit or the other is conductive according as the current supplied to the track rails is of one instantaneous relative polarity or the other, a heating element included in said conductor common to the two plate circuits, a thermo-sensitive element subjected to variations in the temperature of said heating element, and signaling means controlled by said two plate circuits and by said thermo-sensitive element.

7. In combination, a section of railway track, a source of alternating current reversibly connected with the rails of said section, two electron tubes, a grid circuit for each tube energized from said track rails, two plate circuits one for each tube and including a conductor common to the two, the circuits for said tubes being so connected that one plate circuit or the other is conductive according as the current supplied to the track rails is of one instantaneous relative polarity or the other, a relay comprising a thermo-sensitive element and a heating element included in said common conductor a proceed lamp and a caution lamp included respectively in said two plate circuits, a stop lamp connected with a source of current, and a shunt around said stop lamp including the thermo-sensitive element of said relay.

8. In combination, a section of railway track, a source of alternating current reversibly connected with the rails of said section, two electron tubes, a grid circuit for each tube energized from said track rails, two plate circuits one for each tube, the circuits for said tubes being so connected that one plate circuit or the other is conductive according as the current supplied to said track rails is of one relative polarity or the other, a proceed and a caution signal controlled by said two plate circuits respectively, and a stop signal responsive to the presence and absence of vehicles in said track section.

In testimony whereof I affix my signature.

LARS O. GRONDAHL.